(No Model.)
E. C. YOUNG.
GRAIN WEIGHER.
No. 529,229. Patented Nov. 13, 1894.
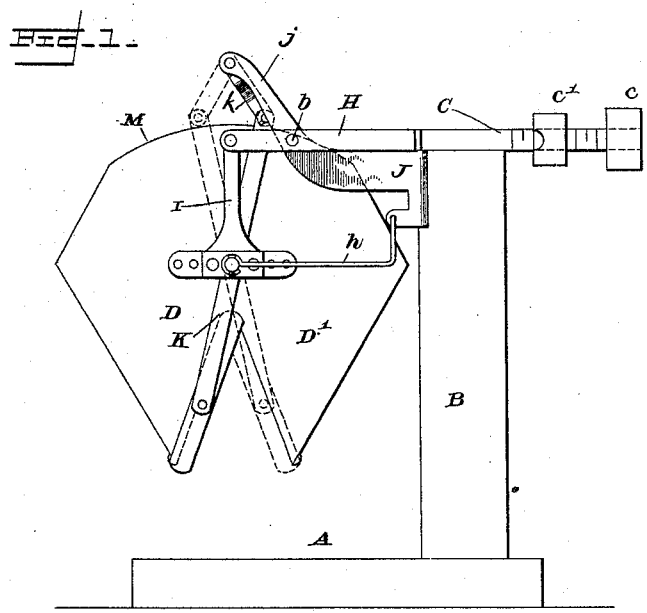
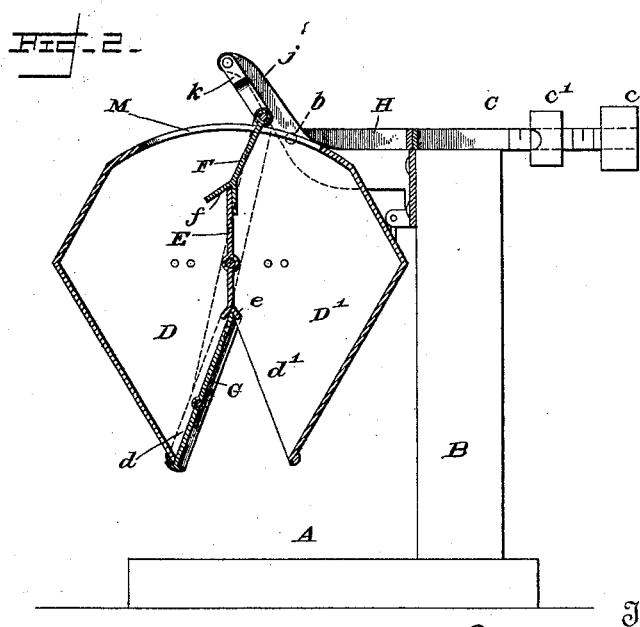
Witnesses
Edw. S. Duvall, Jr.
Wm. L. Boyden
Inventor
Elmer C. Young
per Fred E. Tasker
Attorney
THE NORRIS PETERS CO., PHOTO-LITHO., WASHINGTON, D. C.

UNITED STATES PATENT OFFICE.

ELMER C. YOUNG, OF WASHINGTON, IOWA.

GRAIN-WEIGHER.

SPECIFICATION forming part of Letters Patent No. 529,229, dated November 13, 1894.

Application filed October 31, 1893. Serial No. 489,647. (No model.)

*To all whom it may concern:*

Be it known that I, ELMER C. YOUNG, a citizen of the United States, residing at Washington, in the county of Washington and State of Iowa, have invented certain new and useful Improvements in Grain-Weighers; and I do hereby declare the following to be a full, clear, and exact description of the invention, such as will enable others skilled in the art to which it appertains to make and use the same.

This invention relates to an improvement in weighing meters for weighing grain and other substances, the object being to simplify and perfect the construction of meters of this character and the invention therefore consists essentially in the construction, arrangement and combination of parts substantially as will be hereinafter described and claimed.

In the accompanying drawings illustrating my invention: Figure 1 is a side elevation of my improved meter. Fig. 2 is a vertical section of the same.

Similar letters refer to similar parts throughout both views.

A represents the foundation or base of the main frame which supports my improved weighing apparatus, and B a vertical standard or upright which is secured to the base A. Of course base A and upright B are herein presented simply by way of example in order to show one form of supporting frame. The weighing device may however be hung upon the overhanging part of an elevator or it may be upheld by a differently arranged frame and in fact may be supported in any desired manner and I do not wish to be limited to any particular construction for the framework.

Secured to the upper end of the post or upright B is a metallic frame J carrying the upwardly-extending arms $j\,j$ which are parallel to each other and at a suitable distance apart.

H denotes a horizontal rectangular frame which has two of its parallel sides pivotally supported on the two arms $j\,j$ at points $b\,b$. This horizontal frame H is provided with the rearwardly-extending horizontal scale bar C which extends over the post B and is designed to rest thereon at certain times as shown in the drawings, the outer ends of this scale bar being provided with the permanently-attached weight $c$ and with the movable weight $c'$. These weights however may be variously arranged and the marking upon the scale bar may be changed to suit the pleasure of the builder and user of the apparatus.

The weighing receptacle may be of any suitable size and shape and is preferably made in the form shown in the drawings, where it comprises two chambers D and D', having at their bottom inclined mouths designed to be alternately covered and closed by a vibratory cover. In fact it will be seen that the weighing receptacle is divided into two compartments D and D', by means of a centrally-located partition, consisting essentially of three sections, the middle of which E, is a vertical plate secured rigidly and fixedly in place, while the lower is an oscillating plate G, and the upper section another oscillating plate F.

The inclined mouth at the lower end of the chamber D is designated by the reference letter $d$ and that at the lower end of the chamber D' by the reference letter $d'$. The upper end of the receptacle is provided with an enlarged opening M which leads into either chamber D or D' as may be desired and through which the grain or other substance is fed alternately into these chambers. The lower edge of the fixed section E is provided with two flanges to give it the V-shape represented by the reference letter $e$ and this V-shape receives the upper edge of the oscillating cover plate G, the lower edge of which plate is formed with a double flange to fit over the edge of either mouth $d$ or $d'$ as the case may be. The oscillating plate F is provided on its lower edge with a V-shape $f$ which fits over the upper edge of the plate E and provides a loose hinged joint at this point. The plate F is connected by means of links $k\,k$ to the upper end of the arms $j\,j$, these links $k$ being pivotally attached to the opposite ends of the upper edge of the plate F, and the pivotal attachment may be accomplished in any desired manner, as for instance by running a rod loosely through the material of the upper edge of plate F which is infolded or suitably made tubular for the purpose.

On each side of the main weighing receptacle is an inclined upright connecting bar which is attached at its upper end pivotally to the lower ends of the links $k\,k$ while its lower ends are pivotally attached to the opposite ends of the vibratory cover G, at points about midway of the length of said ends, the mode of pivoting being similar to that at the upper edge of the plate F, although any other mode of pivoting may be adopted if preferred. Furthermore, it will be observed that to each end of the weighing receptacle, is rigidly fastened an upright arm I, the lower end of which is formed with a kind of loop to inclose and guide the movable connecting rod K. The upper ends of the arms I I are pivotally connected to the outermost ends of the side pieces of the rectangular frame H. The lower portions of the arms I connect with the frames J by means of the angular rods $h$ which serve as brace rods.

It will be observed that the weighing receptacle does not oscillate but has simply an up and down vertical movement. The cut-off plate F as will be seen may occupy one or the other of two inclined positions within the upper opening M in the receptacle and the lower cover G in consequence of the side rods K K which connect it with the upper edge of the plate F, will move in a manner corresponding to the movement of the plate F. When therefore the weight within the receptacle becomes heavy enough to oscillate the frame H upon its pivots $b$ and lift the weights on the scale arm, then the receptacle will descend sufficiently far to open one chamber and close the other. Suppose for instance that the parts are in the position shown in Fig. 2, where the cover G closes the lower mouth $d$ of the chamber, D, and the upper plate F is so inclined as to leave open the upper end of the chamber D, while the upper end of the chamber D' is substantially closed, and that at this time grain is being fed into the chamber D, through the upper opening M, when the weight within the chamber D, becomes equal to the weight upon the scale bar, which of course may be predetermined and graduated as preferred, the weighing receptacle will then be caused to descend and its motion in thus descending in a vertical line, will cause the cover G to shift from the mouth of the chamber D to the mouth of the chamber D', and the cut-off F to vibrate from the position in which it is shown in Fig. 2, over into an opposite inclined position so as to leave open the upper end of the chamber D'. When this re-arrangement of parts takes place, of course the grain within the chamber D will be discharged through its open lower end and simultaneously with this discharge, the grain will begin to flow into the other chamber D'. A like operation will take place in respect to this chamber and when a sufficient amount of grain has been placed therein, it will also automatically discharge and the grain will again begin to enter the chamber D. Thus it will be seen that although the arrangement of parts is extremely simple, it will also be found extremely effective and the alternate filling of the two chambers will take place with a continuity of action and the automatic discharge will also follow each filling in a regular and constant manner and thus the meter will be found competent to perform all the duties ordinarily required of meters of more complicated construction.

Numerous changes may obviously be made in the exact construction of the several parts without departing from the invention and I reserve the liberty of making such simple changes as experience may suggest.

Having thus described my invention, what I claim as new, and desire to secure by Letters Patent, is—

1. In a weighing meter, the combination of the main-frame having upwardly extending parallel arms, the horizontal rectangular frame having two of its parallel sides pivotally supported on the aforesaid arms, said rectangular frame being provided with the rearwardly-extending weighted scale bar, the main receptacle of the meter having two interior compartments a partition for separating these compartments consisting of a central rigid section and an upper and lower movable section, said upper section controlling the inlet into the chambers and said lower section controlling the discharge through the lower mouths of said chambers, the upright arms at each end of the main receptacle, the upper ends of said arms being pivotally connected to the aforesaid rectangular frame, while the lower portions of the arms connect with the main frame by means of angular rods serving as brace rods, substantially as described.

2. In a weighing meter, the combination of the frame J having upwardly extending parallel arms $j$, the horizontal rectangular frame H having two of its sides pivotally supported on the arms $j$, said frame being provided with a rearwardly-extending scale bar, the main weighing receptacle divided into two compartments, a centrally-located partition for so dividing the receptacle, consisting essentially of three sections, the middle one E being a rigidly secured vertical plate, the lower one G an oscillating plate and the upper one F an oscillating plate, said plate F being connected by links $k$ $k$ with the upper ends of the arms $j$, an inclined connecting bar on each side of the main receptacle which is attached at its upper end pivotally to the lower end of the links $k$, while at its lower end it is attached to the opposite end of the vibratory cover G, the upright arms I at each end of the weighing receptacle, having their upper ends pivotally connected to the rectangular frame H and the angular rods $h$ connecting the lower portions of the arms I with the frames J, substantially as described.

3. In a weighing meter, the combination of the frame J, having parallel vertical arms $j$, the horizontal rectangular frame H having its sides pivotally supported on the arms $j$ at $b$, said frame having a rearwardly extending scale bar, the main receptacle having two chambers D and D', a partition for separating these chambers consisting of a central rigid section E, an oscillating upper section F, having V-shaped $f$ on its lower edge which fits over the plate E and a lower movable section G whose upper edge fits into a V-shaped $e$ on the lower edge of the section E, and the side connecting rods pivotally attached to the upper and lower sections, together with the rigid arms I on the ends of the receptacle which arms are pivoted to the frame H, substantially as described.

In testimony whereof I affix my signature in presence of two witnesses.

ELMER C. YOUNG.

Witnesses:
   A. S. FOLGER,
   GEO. W. STEUART.